(12) United States Patent
Hein et al.

(10) Patent No.: US 9,300,177 B2
(45) Date of Patent: Mar. 29, 2016

(54) ELECTRIC MOTOR AND BEARING ARRANGEMENT

(71) Applicant: LEANTEC MOTOR GMBH, Saalfeld (DE)

(72) Inventors: Soeren Hein, Munich (DE); Friedrich Boebel, Eurasburg (DE)

(73) Assignee: Leantec Motor GmbH & Co. KG, Saalfeld (DE)

( * ) Notice: Subject to any disclaimer, the term of this patent is extended or adjusted under 35 U.S.C. 154(b) by 0 days.

(21) Appl. No.: 14/403,669

(22) PCT Filed: May 23, 2013

(86) PCT No.: PCT/EP2013/001518
§ 371 (c)(1),
(2) Date: Nov. 25, 2014

(87) PCT Pub. No.: WO2013/174514
PCT Pub. Date: Nov. 28, 2013

(65) Prior Publication Data
US 2015/0145352 A1    May 28, 2015

(30) Foreign Application Priority Data
May 25, 2012   (EP) .................... 12004079

(51) Int. Cl.
| H02K 11/00 | (2006.01) |
| H02K 1/27 | (2006.01) |
| H02K 1/30 | (2006.01) |
| F16C 19/06 | (2006.01) |
| H02K 1/04 | (2006.01) |
| H02K 7/08 | (2006.01) |

(52) U.S. Cl.
CPC .............. *H02K 1/2793* (2013.01); *F16C 19/06* (2013.01); *H02K 1/04* (2013.01); *H02K 1/30* (2013.01); *H02K 7/08* (2013.01); *H02K 7/088* (2013.01); *H02K 7/083* (2013.01); *H02K 2201/03* (2013.01)

(58) Field of Classification Search
CPC ......... H02K 1/30; H02K 1/2793; H02K 7/08; H02K 7/088
See application file for complete search history.

(56) References Cited

U.S. PATENT DOCUMENTS

| 6,483,215 B1 * | 11/2002 | Bodmer et al. ................. 310/90 |
| 6,531,798 B1 * | 3/2003 | Palmero ........................ 310/112 |
| 6,630,761 B1 * | 10/2003 | Gabrys ........................ 310/90.5 |
| 8,188,633 B2 * | 5/2012 | Quere ........................... 310/268 |
| 8,536,750 B2 | 9/2013 | Ai et al. |
| 2006/0244330 A1 * | 11/2006 | Hill ........................ 310/156.05 |

FOREIGN PATENT DOCUMENTS

| DE | 102006036707 B3 | 2/2008 |
| DE | 102008050832 A1 | 4/2010 |
| WO | 2008014253 A2 | 1/2008 |
| WO | 2010040535 A1 | 4/2010 |

\* cited by examiner

*Primary Examiner* — Dang Le
(74) *Attorney, Agent, or Firm* — Laurence A. Greenberg; Werner H. Stemer; Ralph E. Locher

(57) ABSTRACT

An electric motor has a rotor that is rotatably arranged around a rotor shaft. The rotor is mounted by way of at least one outer bearing that is arranged at a radial distance from the rotor shaft. The rotor has an annular design and is connected to the rotor shaft by way of at least one flexible connecting element.

18 Claims, 4 Drawing Sheets

ELECTRIC MOTOR AND BEARING ARRANGEMENT

BACKGROUND OF THE INVENTION

Field of the Invention

Figure 1:
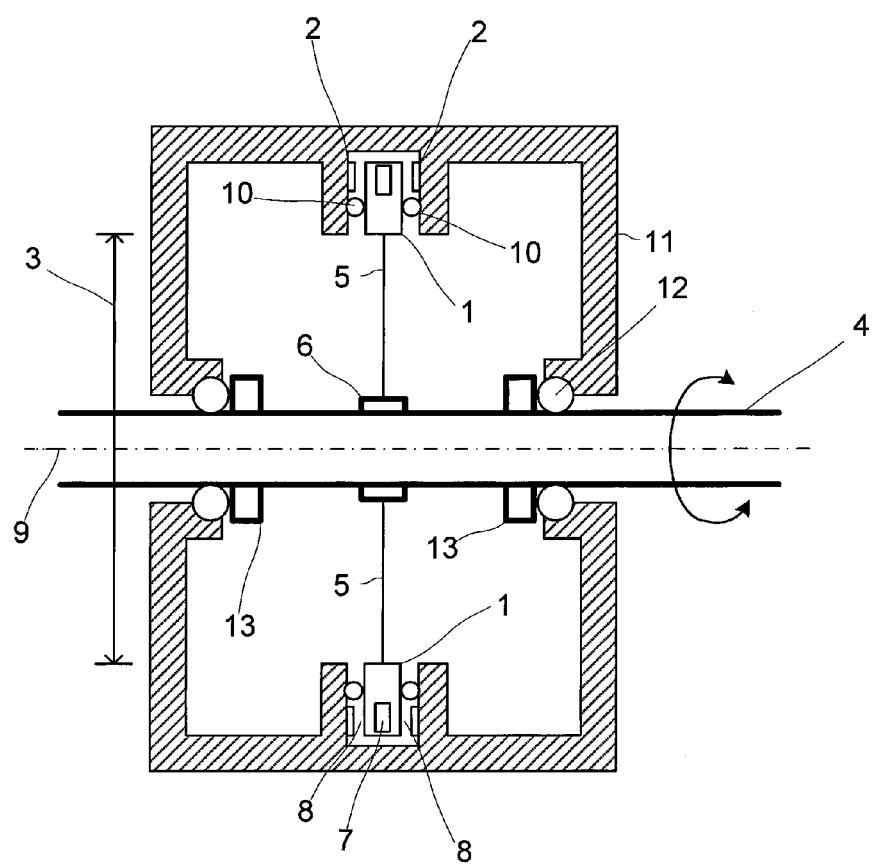

The invention relates to an electrical machine as well as a bearing arrangement comprising a rotor being rotatably arranged around a rotor shaft, wherein the rotor is connected to the rotor shaft such that rotary movements of the rotor are transmitted to the rotor shaft, wherein the rotor is mounted by means of at least one outer bearing being arranged at a radial distance from the rotor shaft.

From DE 10 2006 036 707 B3, an electric motor with a specially designed stator and a disc-shaped rotor equipped with permanent magnets is known. To yield a preferably high magnetic flux density, the air gap between the rotor and the stator should be kept preferably at a low level. Therefore, however, a precise bearing of the rotor is necessary so that it can also run freely and smoothly during impacts or vibrations.

In DE 10 2008 050 832 A1, a bearing arrangement for a rotor is described, comprising at least one rotor bearing, which is in operative connection with the rotor in a region being spaced apart radially from to the rotation axis. Said bearing arrangement shall ensure that the rotor shaft and the rotor attached thereto are kept in the intended position.

Due to torque reasons, rotor and stator are often formed in such a way that the air gap between the rotor and the stator has a large radial distance to the rotor axis. Thereby, already slight tiltings of the rotor axis cause large alterations of the air gap at rotors with a diameter of, for instance, 30 to 40 cm. If the air gaps between rotor and stator are in a region of only several tenths of a millimeter, very high demands are imposed upon the bearing of the rotor so as to run contact free also in case of vibrations of the rotor axis.

BRIEF SUMMARY OF THE INVENTION

The object of the present invention is therefore to develop an electric machine with an improved bearing of the rotor and a corresponding bearing arrangement.

This object is solved by an electric machine with a rotor that is rotatably arranged around a rotor shaft, wherein the rotor is connected to the rotor shaft such that rotary movements of the rotor are transmitted to the rotor shaft, and wherein the rotor is mounted by means of at least one outer bearing being arranged at a radial distance from the rotor shaft, and which is characterized in that the rotor is connected to the rotor shaft such that an axial relative movement between the rotor and the rotor shaft is possible.

The bearing arrangement according to the invention comprises a rotor being rotatably arranged around a rotor shaft wherein the rotor is connected to the rotor shaft such that rotary movements of the rotor are transmitted to the rotor shaft, and wherein the rotor is mounted by means of at least one outer bearing being arranged at a radial distance from the rotor shaft, and which is characterized in that the rotor is connected to the rotor shaft such that an axial relative movement between the rotor and the rotor shaft is possible.

According to the invention, the rotor and the rotor shaft are decoupled to such an extent that small position changes of the rotor shaft, especially due to impacts or vibrations, and also static manufacturing tolerances have no effect on the position of the rotor. Rotor and rotor shaft are connected such that a torque is transmitted from the rotor to the rotor shaft and vice versa, but such that rotor and rotor shaft can move against each other in axial direction to a certain degree. Thereby, the rotor is decoupled from impacts on the rotor shaft or vibrations. Hence, the air gap between rotor and stator remains unaffected by such impacts and the rotor runs smoothly and freely also during vibrations.

In a preferred embodiment, the rotor is in an operative connection with the rotor shaft by at least one flexible connecting element. The flexible connecting element is provided such that it transmits a movement of the rotor in the intended rotor rotation direction to the rotor shaft, and transmits a rotation of the rotor shaft around its longitudinal axis to the rotor in reverse. Hence, the flexible connecting element is stiff with regard to the transmission of these rotary movements. In contrast, relative movements between rotor and rotor shaft in axial direction, to say in direction of the rotor shaft, and/or in radial direction, to say in a direction vertical to the rotor shaft, and/or changes of the angle between the rotor shaft and the geometric axis of the rotor are absorbed by the flexible connecting element and not transmitted.

Here, the axis refers to a geometric axis of the rotor, around which the rotor according to its construction shall rotate. Mostly, the rotor is rotary-symmetrical, to say after one rotation around an angle smaller than 360°, the rotor is congruent with the rotor before the rotation. In such a case, the rotation axis or symmetry axis of the rotor is its geometric axis. The geometric axis can be, for instance, the vertical on the rotor center or on the rotor center of gravity. Without the influence of external interferences such as vibrations, the rotor shaft and the geometric axis of the rotor are coincident.

Preferably, the flexible connecting element absorbs axial as well as radial relative movements between rotor and rotor shaft as well as angle alterations between rotor shaft and rotor respectively its geometric axis. Only rotary movements of the rotor respectively the rotor shaft are transmitted to the respective other element, the rotor shaft respectively the rotor. The invention causes a decoupling of the rotor and the rotor shaft with regard to external influences. Thereby, the rotor remains unaffected by vibrations and oscillations of the rotor shaft and by impacts on the rotor shaft. Even tiltings or torsions of the rotor shaft do not disturb the concentricity of the rotor.

Preferably, the rotor is of annular design. By the phrase "annular design of the rotor", a design is meant by which the rotor is not in direct contact to the rotor shaft, but is indirectly connected to the rotor shaft by the flexible connecting element. The inner diameter of the rotor is larger than the intake provided therefore at the rotor shaft, so that there is space left for the interposition of the flexible connecting element.

In a preferred embodiment of the invention, the rotor and the flexible connecting element are of integral design. By the term "integral design", a design is meant by which the rotor and the flexible connecting element are of one material and form one work piece. Rotor and flexible connecting element can also be of different materials and can be firmly connected, for instance, glued or welded together.

In a further embodiment, the flexible connecting element is provided as separate component, which is mounted between rotor and rotor shaft.

The flexible connecting element comprises, for instance, an elastic disc or membrane. The expansion of the elastic disc or membrane in the disc plane is chosen significantly larger than its thickness. Thereby, the elastic disc/membrane provides the desired flexibility and ensures the decoupling of the rotor shaft and the rotor regarding to oscillations, vibrations, and impacts. By the term membrane, in particular a disc is meant, whose maximum expansion in the disc plane is at least the tenfold, at least the twentyfold, or at least the fiftyfold of its thickness. The elastic disc or membrane can be provided as solid disc with openings or recesses or in segment structure. Furthermore, it is possible to provide the disc with bended or folded structures, which deform at axial movements, thereby ensuring the desired flexibility in axial direction. Preferably, the disc is of plastic. The advantage of such a membrane coupling by means of an elastic disc or membrane is their rotational stiffness, to say the direct, clearance-free transmission of the torque between rotor and rotor shaft. For instance, a diaphragm spring or plate spring can be used as flexible connecting element.

The connection of rotor and rotor shaft is advantageously provided torsionally stiff. For this purpose, the above mentioned membrane couplings are particularly suitable, wherein rotor and flexible connecting element as well as flexible connecting element and rotor shaft are connected to one another torsionally stiff, particularly inseparable connected to one another or provided as single piece.

A torsionally stiff connection of rotor and rotor shaft, which enables relative movements in axial direction, can also be produced by an interlocking manner. Such interlocking connections are implemented, for instance, in tooth couplings or claw couplings. Here, at least one of both components—rotor and/or rotor shaft—comprises extensions or teeth, which interlock to the corresponding counterparts of the other component. Exemplarily, the rotor can be formed annually and with an internal toothing at its inner circumference. The rotor shaft comprises a corresponding external toothing. The external diameter of the rotor shaft respectively the part of the rotor shaft, which comprises the external toothing, is chosen such that the internal toothing of the rotor and the external toothing of the rotor shaft interlock when the rotor is shifted over the rotor shaft. The toothing guarantees, on the one hand, a torsionally stiff connection of rotor and rotor shaft, on the other hand, it has a degree of freedom in axial direction, to say rotor and rotor shaft can be axially shifted against each other in order to absorb vibrations, for instance.

The internal and/or external toothing(s) can be provided straight or convex. The convex design of at least one of the two toothing systems, for instance, of the external toothing, enables the compensation of angular misalignment of the rotor shaft besides the axial relative moments of rotor and rotor shaft as mentioned.

Vibrations of the rotor shaft have an especially strong impact on the air gap between rotor and stator in electrical machines, electric motors, or generators with a large rotor diameter. Therefore, the invention is particularly suitable for electrical machines with a disc-shaped rotor, to say with a rotor comprising an expansion being parallel to the geometrical axis of the rotor, to say whose axial expansion is smaller than its expansion in radial direction. The diameter of the rotor is preferably at least threefold, at least fivefold, or at least tenfold as large as its thickness, to say as its axial expansion. The invention is of advantage for electrical machines being provided with a rotor diameter between 12 cm and 240 cm, particularly between 20 cm and 60, and/or in machines with a small air gap between rotor and stator, especially for motors, at which the air gap is less than 2 mm, less than 1 mm, less than 0.7 mm, or less than 0.5 mm.

The invention also relates particularly to electric motors, whose rotor is produced from carbon material, plastic material, or a composite material, in particular a fiber composite material. Such motors are described, for instance, in DE 10 2006 036 707 B3, which has been mentioned at the beginning.

In a further preferred embodiment, the rotor is provided with a large number of permanent magnets. The permanent magnets can, for instance, be glued on the rotor, or can be preferably provided in, glued in, or laminated into corresponding recesses in the rotor.

By the invention-related combination of outer bearing, ring-shaped rotor, and the flexible connecting element, rotor and rotor shaft are decoupled from each other with regard to vibrations, oscillations, or impacts. Thereby, the concentricity of the rotor is not disturbed even with external influences on the rotor shaft. The same applies for the combination of outer bearing and interlocking connection between rotor and rotor shaft, wherein rotor and rotor shaft are axially shiftable against each other.

The invention is particularly advantageous in axial flux machines, at which the magnets being provided at the rotor and are axially spaced from the stator. The axial flux machine can either comprise stators on both sides of the rotor or only on one side. In particular, the axial flux machine is provided as disc rotor machine. At an axial flux machine, the air gap between rotor and stator extends in axial direction. Only small tiltings of the rotor shaft can have a considerable impact on the air gap width. Hence, the invention is particularly advantageous for such machines. By decoupling the rotor bearing and the bearing of the rotor shaft, the free running of the rotor is also secured during impacts or vibrations of the rotor shaft.

It is of additional advantage, to provide at least one shaft bearing for bearing the rotor shaft. The shaft bearing(s) support and store the rotor shaft and ensure that the rotor shaft remains in the intended position also when running. The shaft bearing(s) particularly serve(s) for absorption of radial and/or axial forces on the rotor shaft, for instance, of oscillations and vibrations and impacts or collisions on the rotor shaft. In an embodiment with a flexible connecting element, the shaft bearing(s) can either be provided in immediate proximity of the flexible connecting element, which connects the rotor with the rotor shaft, or can be provided clearly spaced apart thereof.

According to a further embodiment of the invention, the shaft bearing and the outer bearing are directly connected with the casing of the electrical machine.

An outer bearing refers to a bearing, which is radially spaced to the rotor shaft and is provided as bearing of the rotor. The rotor can be provided with one or several outer bearing(s) according to the invention.

The rotor of the electric motor according to the invention is preferably provided with a large number of permanent magnets, which are in a defined radial distance to the rotor center, to say to the geometrical rotor axis. The outer bearing(s) in radial direction can be distanced less far, further, or as far as the permanent magnets to the rotor center. Correspondingly, the outer bearing or the outer bearings in radial direction can be closer to the rotor shaft, further to the rotor shaft or as far away to the rotor shaft as the stator. Preferably, the outer bearing(s) are provided closer to the permanent magnets than to the rotor shaft.

The outer bearing can be provided as slide bearing or roller bearing. Advantageously, the outer bearing comprises rotatably mounted bodies, to say the outer bearing is also provided as antifriction bearing, ball bearing, or roller bearing. The rotatably mounted bodies are, preferably, of non-magnetic and/or non-metallic material, for instance, the bodies are of ceramic, particularly ceramic balls. The rotatably mounted bodies can be provided rotatably in the motor component carrying the stator or in the rotor. Preferably, the rotatably mounted bodies are provided in the component comprising the stator, for instance, in a motor casing component. In this case, the rotor is provided such that, for instance, said rotor touches the rotatably mounted bodies. During the rotation of the rotor, the rotatably mounted bodies roll off on the rotor and keep said rotor with regard to the stator in such position that the air gap between rotor and stator remains constant. In another embodiment, the rotatably mounted bodies are additionally damped or mounted with an intermediary spring element.

The contact surface between a rotatably mounted body and the rotor is preferably point-shaped in order to avoid shearing forces on the rotatably mounted bodies due to different circumferential speeds. The rotatably mounted bodies are provided convex in the region, in which they are in contact to the rotor, or the corresponding counter face on the rotor comprises a minimum expansion in radial direction. The latter can be realized, for instance, by providing the rotor with a basically one-dimensional running surface for the rotatably mounted bodies. For instance, a correspondingly circular-shaped wire as running surface can be mounted on the rotor.

In the above mentioned embodiment of the outer bearing with rotatably mounted bodies, it is of advantage when the rotor is provided with a running surface of hardened metal, ceramic, or glass. Such a running surface provides a fixed, uniform rolling surface, which also maintains the original rolling surface properties, and thus ensures that the rotor can rotate at a constant air gap.

BREIF DESCRIPTION OF THE SEVERAL VIEWS OF THE DRAWING

Figure 2:
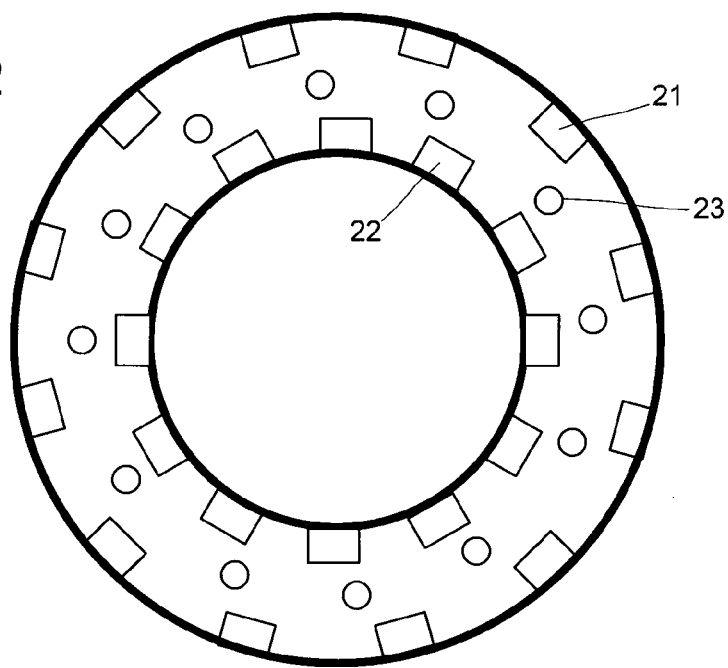
Figure 3:
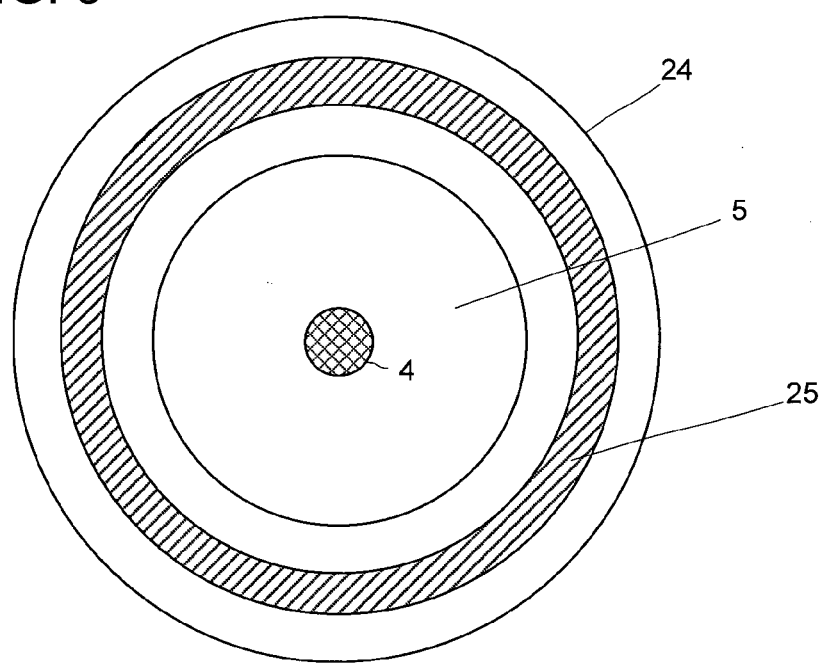
Figure 4:
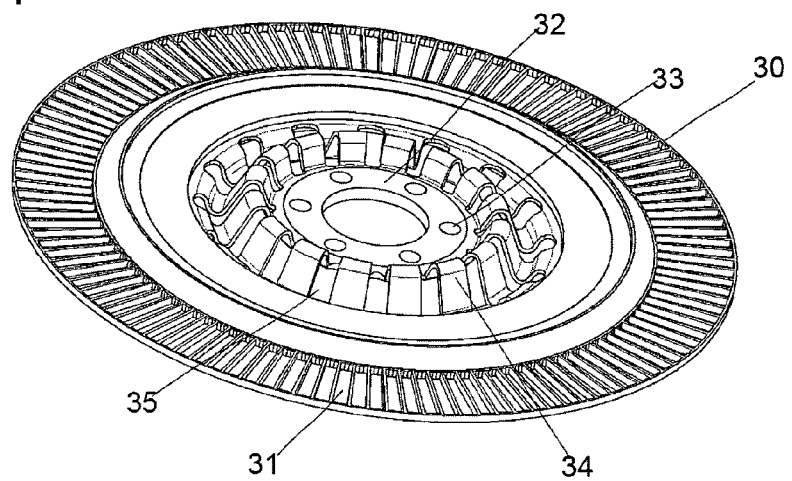
Figure 5:
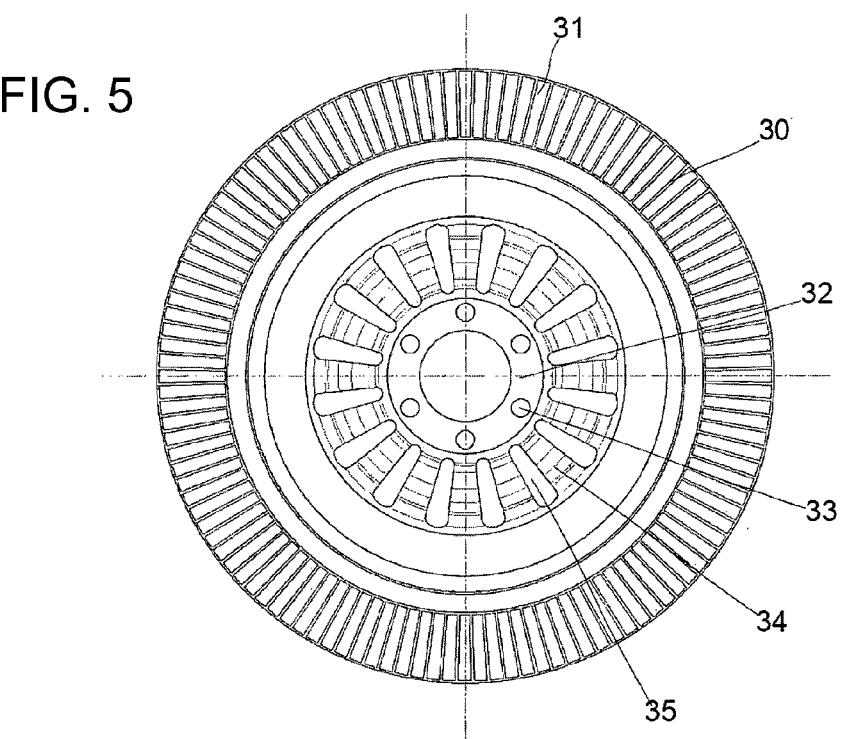
Figure 6:
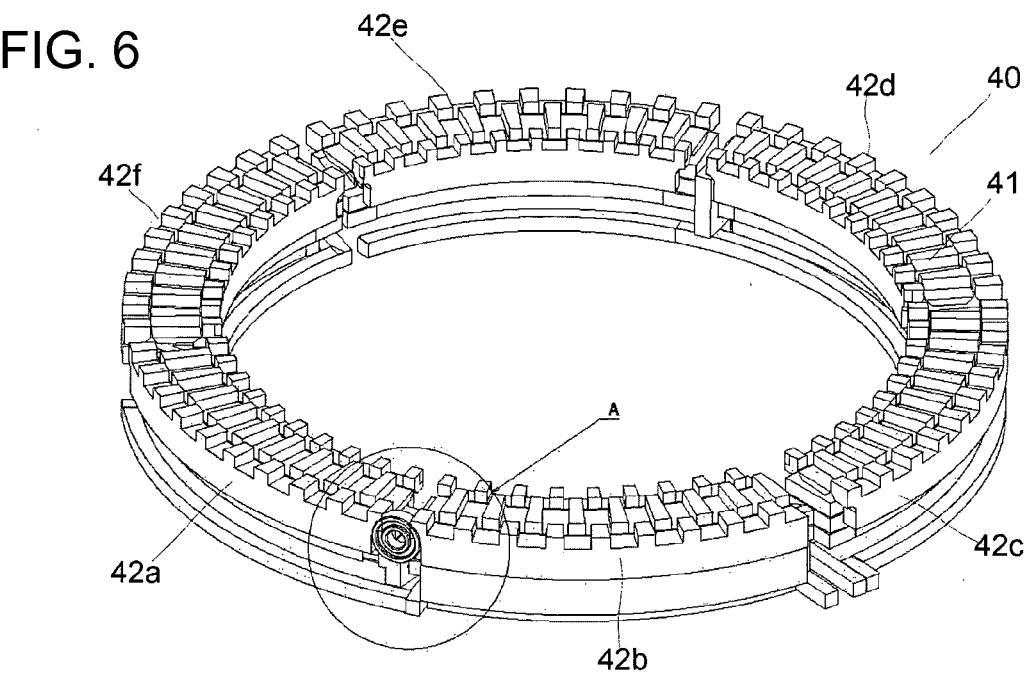
Figure 7:
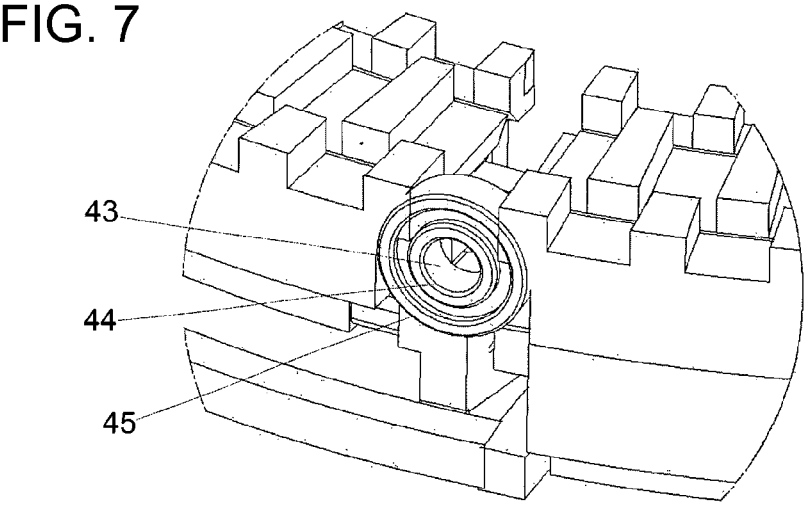

The invention and further details of the invention are described in more detail by schematic drawings in the following, wherein:

FIG. 1 shows the bearing arrangement of an electric motor according to the invention, FIG. 2 shows a variant of the stator and the outer bearing, FIG. 3 shows the embodiment of the rotor corresponding to FIG. 2, FIG. 4 shows another preferred embodiment of the rotor, FIG. 5 shows the top view on the rotor according to FIG. 4, FIG. 6 shows a preferred embodiment of a bearing arrangement, and FIG. 7 shows details of FIG. 6.

DESCRIPTION OF THE INVENTION

In FIG. 1, an electric motor according to the invention is schematically shown. The electric motor comprises a ring-shaped rotor 1 and a stator 2, which comprises stator teeth 2 provided on both sides of the rotor 1. The term stator teeth refers to all types of protrusions, grooving, projections and indentations of the stator conducting the magnetic flow. The stator teeth are basically provided on a circle, which extends vertical to the drawer layer of FIG. 1. The stator winding is not shown in the Figures for reasons of clarity.

Rotor 1 is provided as ring-shaped disc with an external diameter of, for instance, 30 cm to 40 cm. The internal diameter of the rotor 1 is preferably between 10 cm and 30 cm. The rotor 1 is basically provided of a fiber composite material, particularly a carbon material, in or at which permanent magnets 7 are detached. In the variant shown in FIG. 1, rotor 1 comprises recesses, into which permanent magnets 7 are laminated. The rotor 1 comprises, for instance, between 80 and 150 permanent magnets 7, which are evenly provided over the rotor 1.

Between the rotor 1 and the stator teeth 2 provided on both sides of the rotor 1, a small air gap 8 with a width of, for instance, 0.5 mm is provided, respectively.

Due to the relatively large radial expansion of the rotor 1 (in this example 15 cm to 20 cm radius) and the very small air gap 8, slight tilting of the geometrical axis of the rotor 1 cause large relative and absolute changes of the air gap 8. The rotor 1 is preferably provided rotary-symmetrical. The rotation axis or symmetry axis of the rotor 1 thereby forms the geometrical axis of said rotor.

The rotor 1 is connected to a rotor shaft 4 such that a rotary movement of the rotor 1 results in a rotary movement of the rotor shaft 4, and vice versa. If rotor 1 would be fixed to the rotor shaft 4, the geometrical axis of the rotor 1 and the rotor shaft 4 would then coincide. Tiltings, vibrations, or shocks of the rotor shaft 4 would thereby be equivalent to corresponding position changes of the geometrical axis of the rotor 1 and would cause undesired changes of the air gap or would even result in a rubbing of the rotor.

Hence, according to the invention, the inner diameter 3 of the rotor 1 is larger than the external diameter of the rotor shaft 4. The connection of the rotor 1 with the rotor shaft 4 is provided by a flexible rotor membrane 5 of plastic. The rotor membrane 5 is fixed at an inner diameter of the ring-shaped rotor 1 and by a fastening element 6 at the rotor shaft 4. The rotor membrane 5 is flexible in axial direction, to say in direction of the rotation axis 9 of the rotor shaft 4. Axial impacts on the rotor shaft 4, to say impacts in direction of the rotation axis 9, result in a deforming of the rotor membrane 5, and thus are absorbed by the rotor membrane 5 without the impacts having an effect on the position of the rotor 1. The same applies to tilting of the rotor shaft 4.

The rotor membrane 5, in contrast, basically transmits rotary movements of the rotor 1 directly to the rotor shaft 4 and correspondingly, rotary movements of the rotor shaft 4 directly to the rotor 1. The torque is transmitted directly and free of play.

An outer bearing is provided for the bearing of the rotor 1. In the example shown in FIG. 1, the outer bearing is provided at a casing 11 of the motor. The outer bearing comprises guides 10, which guide the rotor 1 such that the air gap 8 between the stator teeth 2 and the rotor 1 always remains at the same width. The guides 10 can, as shown in FIG. 1, have a smaller radial distance to the rotor shaft 4 than the stator teeth 2 and the permanent magnets 7. However, it is also possible to provide the guides 10 radially outside the stator teeth 2 respectively the permanent magnets 7, to say further away from the rotor shaft 4 than the stator teeth 2 respectively the permanent magnets 7. In the FIGS. 2 and 3, an embodiment is shown, at which the guides 10 comprise the same distance from the rotor shaft 4 as the permanent magnets 7.

The guides 10 are provided such that the rotor 1 in axial direction is kept in its relative position to the stator 2. In a preferred embodiment, the guides 10 are provided as ball bearing 10. In or at the casing 11, rotatable mounted balls 10 are provided such that the balls 10 are in contact with the upper side of the rotor 1 and with the lower side of the rotor 1. Here, the two sides limiting the rotor 1 in axial direction are defined as upper side and lower side. At least three rotatable mounted balls 10 are provided at the upper side as well as at the lower side of the rotor 1, respectively.

Instead of or additionally to the mentioned ball bearings, the guides 10 can also be provided as roller bearing or plain bearing. It is significant that the rotor 1 can rotate with minimal friction in or between the guides 10, and that the rotor 1 in axial direction is fixed relatively to the stator 2. It is also possible to provide additional bearings, which keep the rotor 1 in radial direction, to say which prevent position changes of the rotor 1 in radial direction, again being relative to the stator 2. Generally, the rotor in an axial flux disc motor is, however, self-centering so that the mentioned additional bearings are not absolutely necessary.

Furthermore, shaft bearings 12 are provided in order to support the rotor shaft 4. The shaft bearings 12 are preferably provided as ball bearing or roller bearing and shall keep the rotor shaft 4 in the desired position. Moreover, it is favorable to provide flanges 13 at the rotor shaft 4, which provide, together with the shaft bearings 12, protection against axial impacts. The two flanges 13 are provided between both shaft bearings 12 such that the rotor shaft 4 in axial direction is fixed relatively to the casing 11.

The invention decouples the bearing of the rotor shaft 4 from the bearing of the rotor 1. Thereby, a rubbing of the rotor 4 at the stator 2 can be prevented in case of a mechanical shock or stroke on the rotor shaft.

A preferred arrangement of the stator teeth is shown in FIG. 2. The stator teeth 21, 22 are provided in two concentric circles so that said teeth are arranged adversely to the rotor-ring in the electric motor. An external circle of stator teeth 21 and an inner circle of stator teeth 22 are provided, wherein the inner and the external stator teeth are staggered in reverse order.

Several ceramic balls 23 are rotatably mounted between both circles of stator teeth 21, 22. The ceramic balls 23 are used to keep the rotor 24 in a fixed distance to the stator 21, 22. It has further proved advantageous to provide the ceramic balls in a damped manner.

The rotor 24 is schematically shown in FIG. 3. The rotor 24 is provided as ring-shaped disc and is connected to the rotor shaft 4 by a rotor membrane 5 or a different suitable flexible connecting element as described by FIG. 1.

The rotor 24 comprises a large number of recesses for an incorporation of permanent magnets, which are arranged evenly and at a fixed angle distance to each other. The permanent magnets are laminated into the rotor 24 being of a fiber composite material. The recesses with the magnets are not shown in FIG. 3 for reasons of clarity.

A hardened metal stripe 25 is applied on the upper side of the rotor 24. The metal stripe 25 covers the subjacent, laminated permanent magnets. The metal stripe 25 rotates with the rotating magnetic field, and is thus always exposed to the same magnetic field. To say, the metal stripe "sees" a constant, unchanging magnetic field.

The rotor 24 is arranged such that the ceramic balls 23 touch the metal stripe 25. At a rotation of the rotor 24, the ceramic balls 23 roll off on the metal stripe 25 and keep the rotor 24 and the stator 21, 22 in a fixed distance to each other.

In principle, it is possible to let the ceramic balls or other suitable rotatable mounted bodies directly roll off on the rotor material instead of on the hardened metal stripe 25. It is of advantage, however, when a hard and permanent material is applied on the rotor as roller surface for the rotatable mounted body. This can be realized, for instance, by vaporizing a metal, ceramic, or alternative hard layer.

In the FIGS. 4 and 5, a further variant of a rotor according to the invention is shown. The rotor and the flexible connecting element are provided as one piece and produced from plastic in this case. The rotor comprises an outer ring 30, which comprises a large number of recesses 31, in which the permanent magnets can be inserted. At its inner circumference, the rotor has a mounting ring 32, which comprises bore holes 33. The rotor can be fixed to a corresponding flange at the rotor shaft by means of the mounting ring 32.

Between the inner mounting ring 32 and the outer ring 30, a flexible connecting region is provided. The flexible connecting region comprises several spoke-shaped arranged plates 34 in radial direction, which are bended or folded in a Z-shape. The plates 34 can provide one, two, or more bendings, breaks, or foldings, which deform by an axial shift of the mounting ring 32 against the outer ring 30. In circumference direction, however, the plates 34 are stiff so that torque of the outer ring 30 can be transmitted to the mounting ring 32 without any losses. The entire rotor is provided torsionally stiff. Openings 35 are provided between the single plates 34.

Thereby, the rotor shown in the FIGS. 4 and 5 simultaneously provides the function of the flexible connecting element.

FIG. 6 shows an embodiment of the outer bearing according to the invention. By the reference sign 41, the stator grooves are indicated. The rotor is not shown for reasons of clarity. The stator grooves 41 are arranged circularly in several sectors 42a, 42b, 42c, 42d, 42e, 42f. Between two of such sectors 42a, 42b, a miniature roller bearing 43 is provided. The miniature roller bearing 43 comprises an inner ring 44 and an outer ring 45, between which rolling bodies, for instance rollers or balls, are provided. The inner ring 44 is fixed to the stator and/or to the not shown motor casing. The rotation axis of the miniature roller bearing 43 is radially directed. The outer ring 45 is freely movable in tangential direction.

The rotor is provided on the outer rings 45 of the miniature roller bearing 43 according to the drawings of FIGS. 6 and 7. The rotor rotates nearly without friction on the rotatable outer rings 45 of the miniature roller bearings 43.

Preferably, three miniature roller bearings 43 are provided, which are evenly provided over the circumference of the stator. The outer rings 45 of the miniature roller bearings 43 protrude, for instance, 0.5 mm of the level defined by the upper side of the stator, thereby ensuring a fixed air gap between stator and rotor.

On the other side of the rotor, a corresponding outer bearing is provided with three or more miniature roller bearings.

The invention claimed is:

1. An electrical machine, comprising:
   a rotor rotatably mounted for rotation around a rotor shaft;
   at least one outer bearing mounting said rotor at a radial distance from said rotor shaft; and
   said rotor shaft being connected to said rotor by way of a flexible connecting element for transmitting rotational movements of said rotor to said rotor shaft, said flexible connecting element comprising an elastic disc; and
   a connection between said rotor and said rotor shaft enabling an axial relative movement between said rotor and said rotor shaft.

2. The electrical machine according to claim 1, wherein said rotor is an annular rotor and said flexible connecting element is configured to permit one or more movements selected from the group consisting of axial relative movements, radial relative movements, and angular relative movements between respective geometric axes of said rotor and said rotor shaft.

3. The electrical machine according to claim 1, wherein said rotor and said flexible connecting element are integrally formed in one piece.

4. The electrical machine according to claim 1, wherein said flexible elastic disc is a membrane or a plate spring.

5. The electrical machine according to claim 1, wherein said rotor and said rotor shaft are connected to one another with a positively interlocking connection.

6. The electrical machine according to claim 1, wherein said rotor has an internal toothing and said rotor shaft has an external toothing.

7. The electrical machine according to claim 1, wherein said rotor is a disc-shaped rotor.

8. The electrical machine according to claim 1, wherein said rotor is formed of a plastic material or of a composite material.

9. The electrical machine according to claim 8, wherein said rotor is formed of a fiber composite material.

10. The electrical machine according to claim 1, wherein said electrical machine is an axial flux machine.

11. The electrical machine according to claim 1, wherein said rotor comprises a multiplicity of permanent magnets.

12. The electrical machine according to claim 1, which comprises at least one shaft bearing for mounting said rotor shaft.

13. The electrical machine according to claim 1, wherein said outer bearing comprises rotatably mounted bodies.

14. The electrical machine according to claim 13, wherein said rotatably mounted bodies form a roller bearing or a ball bearing.

15. The electrical machine according to claim 13, wherein said rotatably mounted bodies are mounted with damped mounting.

16. The electrical machine according to claim 13, wherein said rotor is formed with a running surface of a material selected from the group consisting of hardened metal, ceramic, and glass, and wherein said rotatably mounted bodies are in contact with said running surface.

17. The electrical machine according to claim 1 configured as an electric motor.

18. A bearing arrangement for a machine having a rotor shaft, a rotor rotatably mounted for rotation about the rotor shaft, the bearing arrangement comprising:
- at least one outer bearing mounting the rotor at a radial distance from the rotor shaft;
- an elastic disc forming a flexible connecting element between the rotor and the rotor shaft configured to transfer a rotary movement of the rotor to the rotor shaft, said flexible connecting element further enabling an axial relative movement between the rotor and the rotor shaft.

\* \* \* \* \*